United States Patent
Sundara-Rajan

(10) Patent No.: US 9,898,153 B2
(45) Date of Patent: Feb. 20, 2018

(54) FORCE SENSING USING CAPACITIVE TOUCH SURFACES

(71) Applicant: GOOGLE INC., Mountain View, CA (US)

(72) Inventor: Kishore Sundara-Rajan, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 163 days.

(21) Appl. No.: 15/058,584

(22) Filed: Mar. 2, 2016

(65) Prior Publication Data

US 2017/0255293 A1    Sep. 7, 2017

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 3/0418* (2013.01)

(58) Field of Classification Search
CPC ....... G06F 3/044; G06F 3/0414; G06F 3/0418
See application file for complete search history.

(56) References Cited

U.S. PATENT DOCUMENTS

| | | |
|---|---|---|
| 5,847,690 A | 12/1998 | Boie et al. |
| 6,002,389 A | 12/1999 | Kasser |
| 6,483,498 B1 | 11/2002 | Colgan et al. |
| 6,865,960 B2 | 3/2005 | Doemens et al. |
| 8,098,233 B2 | 1/2012 | Hotelling et al. |
| 8,274,494 B2 | 9/2012 | Frey et al. |
| 8,432,362 B2 | 4/2013 | Cheng et al. |
| 8,797,301 B2 | 8/2014 | Ryshtun et al. |

(Continued)

FOREIGN PATENT DOCUMENTS

| | | |
|---|---|---|
| EP | 2924547 A1 | 9/2015 |
| GB | 2445178 A | 7/2008 |

(Continued)

OTHER PUBLICATIONS

Combined Search and Examination Report received for GB Patent Application No. 1621602.0, dated Jun. 5, 2017, 7 pages.

(Continued)

*Primary Examiner* — Shaheda Abdin
(74) *Attorney, Agent, or Firm* — Brake Hughes Bellermann LLP

(57) ABSTRACT

In one general aspect, a method can include identifying contact with a surface of a touch-sensitive input device, identifying a location of the contact on the surface of the touch-sensitive input device, and calculating a change in a mutual capacitance between a first electrode and a second electrode included in a sensor module disposed below the surface of the touch-sensitive input device. The first electrode can be adjacent to the second electrode. The first electrode and the second electrode can be located approximate to the identified location of the contact on the surface of the touch-sensitive input device. The method can include estimating a contact-coupled capacitance based on the calculated change in a mutual capacitance between the first electrode and the second electrode, and calculating a force applied to the surface of the touch-sensitive input device at the identified location.

20 Claims, 7 Drawing Sheets

(56) References Cited

U.S. PATENT DOCUMENTS

| | | |
|---|---|---|
| 2005/0140661 A1 | 6/2005 | Collins |
| 2006/0197753 A1 | 9/2006 | Hotelling |
| 2007/0240044 A1 | 10/2007 | Fux et al. |
| 2007/0247431 A1 | 10/2007 | Skillman et al. |
| 2007/0248799 A1 | 10/2007 | DeAngelis et al. |
| 2008/0048990 A1 | 2/2008 | Cho et al. |
| 2008/0084387 A1 | 4/2008 | McArdle |
| 2008/0158145 A1 | 7/2008 | Westerman |
| 2008/0266143 A1 | 10/2008 | Ohshita et al. |
| 2008/0280658 A1 | 11/2008 | Clemens |
| 2008/0297487 A1* | 12/2008 | Hotelling ............ G06F 1/3203 345/173 |
| 2009/0046065 A1 | 2/2009 | Liu et al. |
| 2009/0189867 A1* | 7/2009 | Krah ............ G06F 3/044 345/173 |
| 2009/0219257 A1 | 9/2009 | Frey et al. |
| 2009/0273577 A1* | 11/2009 | Chen ............ G06F 3/044 345/174 |
| 2009/0284495 A1 | 11/2009 | Geaghan et al. |
| 2009/0322687 A1 | 12/2009 | Duncan et al. |
| 2010/0026655 A1* | 2/2010 | Harley ............ G06F 3/044 345/174 |
| 2010/0053087 A1 | 3/2010 | Dai et al. |
| 2011/0018556 A1 | 1/2011 | Le et al. |
| 2011/0134071 A1 | 6/2011 | Kim et al. |
| 2011/0175835 A1* | 7/2011 | Wang ............ G06F 3/0416 345/173 |
| 2011/0273396 A1 | 11/2011 | Chung |
| 2012/0035853 A1 | 2/2012 | Westhues et al. |
| 2012/0218210 A1 | 8/2012 | DeCaro et al. |
| 2012/0218221 A1 | 8/2012 | Igeta |
| 2013/0038572 A1 | 2/2013 | Frey et al. |
| 2013/0063391 A1 | 3/2013 | Kang et al. |
| 2013/0093500 A1 | 4/2013 | Bruwer |
| 2013/0155001 A1 | 6/2013 | Yilmaz et al. |
| 2015/0062068 A1 | 3/2015 | Shih et al. |
| 2015/0091859 A1 | 4/2015 | Rosenberg et al. |
| 2015/0153951 A1 | 6/2015 | Kim et al. |

FOREIGN PATENT DOCUMENTS

| | | |
|---|---|---|
| KR | 10-2015-0124431 A | 11/2015 |
| WO | 2011/156447 A1 | 12/2011 |
| WO | 2014/052743 A1 | 4/2014 |
| WO | 2014/092758 A1 | 6/2014 |
| WO | 2015/106183 A1 | 7/2015 |

OTHER PUBLICATIONS

Chamary et al., "3D Touch in iPhone 6S Isn't Just a Gimmick. Here's How It Works", Available online at <http://www.forbes.com/sites/jvchamary/2015/09/12/3d-touch-iphone-6s/>, Sep. 12, 2015, 7 pages.

Enikov et al., "Three-Dimensional Microfabrication for a Multi-Degree-Of-Freedom Capacitive Force Sensor Using Fibre-Chip Coupling", Journal of Micromechanics and Microengineering, vol. 10, No. 4, Jan. 17, 2000, pp. 492-497.

Purcher, "Apple's Force Touch for iPhone Invention was Published Today", Available online at <http://www.patentlyapple.com/patently-apple/2015/07/apples-force-touch-for-iphone-invention-was-published-today.html>, Jul. 16, 2015, 7 pages.

Purcher, "Apple's Reported 3D Force Touch is Fully Supported by a Patent", available online at <http://www.patentlyapple.com/patently-apple/2015/09/apples-reported-3d-force-touch-is-supported-by-a-patent.html>, Sep. 6, 2015, 4 pages.

3M Touch Systems, "Projected Capacitive Technology", available online at <http://multimedia.3m.com/mws/media/788463O/tech-brief-projected-capacitive-technology.pdf>, 2013, 8 pages.

Wolffenbuttel et al., "The Accurate Measurement of a Micromechanical Force Using Force-Sensitive Capacitances", IEEE Transactions on Instrumentation and Measurement, vol. 44, No. 2, Apr. 1995, pp. 188-191.

Takamatsu et al., "Fabric Touch Sensors Using Projected Self-Capacitive Touch Technique", Sensors and Materials, vol. 25, No. 9, Jun. 10, 2013, pp. 627-634.

DeCanne, "Challenges of display integrated with touch", Cypress Semiconductor Inc., EDN Asia | ednasia.com, Dec. 4, 2012, 4 pages.

Walker "Part 1: Fundamentals of Projected-Capacitive Touch Technology", SID Display Week '14 V1.2, Intel Corporation, Jun. 1, 2014, 315 pages.

Buxton et al., "Issues and Techniques in Touch-Sensitive Tablet Input", Siggraph '85, vol. 19, No. 3, 1985, pp. 215-224.

Blasko, et al, "Single-Handed Interaction Techniques for Multiple Pressure-Sensitive Strips", Extended Abstracts of the Conference on Human Factors in Computing Systems (CHI 2004), Apr. 24-29, 2004 Vienna, Austria, pp. 1461-1464.

* cited by examiner

FORCE SENSING USING CAPACITIVE TOUCH SURFACES

TECHNICAL FIELD

This document relates, generally, to computing devices that include touch-sensitive input devices.

BACKGROUND

Computing devices can provide a user with multiple ways to control the operations of and to input data to a computing device. A computing device can include, for example, a touchscreen display device, a keyboard, a mouse, a trackpad, a touchpad, a pointing stick, one or more mouse buttons, a trackball, a joystick, and other types of input devices. A user of the computing device can interact with one or more of these input devices when providing input to and/or otherwise controlling the operation of an application running on the computing device. For example, the user can interact with the computing device by making direct contact with (e.g., touching with one or more fingers, touching with a stylus) the touchscreen display device.

A touchpad, which may also be referred to as a trackpad, can be included in a computing device and can be used as a pointing device to facilitate user interaction with the computing device. For example, a user can interact with the touchpad by making direct contact with the touchpad (e.g., touching with one or more fingers, touching with a stylus). In some cases, the touchpad can be used in place of or in addition to a mouse to maneuver a cursor on a display device included in the computing device, or to trigger one or more functions of the computing device.

SUMMARY

In one general aspect, a method can include identifying, by a computing device, contact with a surface of a touch-sensitive input device, identifying, by the computing device, a location of the contact on the surface of the touch-sensitive input device, calculating a change in a mutual capacitance between a first electrode and a second electrode included in a sensor module disposed below the surface of the touch-sensitive input device, the first electrode being adjacent to the second electrode, the first electrode and the second electrode located approximate to the identified location of the contact on the surface of the touch-sensitive input device, estimating a contact-coupled capacitance based on the calculated change in a mutual capacitance between the first electrode and the second electrode, and calculating a force applied to the surface of the touch-sensitive input device at the identified location based on a change in self-capacitance of the first electrode and the second electrode and based on the estimated contact-coupled capacitance.

Implementations can include one or more of the following features, alone or in combination with one or more other features. For example, the method can further include calculating a change in a mutual capacitance between a third electrode and the second electrode included in the sensor module, the third electrode being adjacent to the second electrode and located closer to the identified location of the contact on the surface of the touch-sensitive input device than the first electrode. Estimating a contact-coupled capacitance can be further based on the calculated change in a mutual capacitance between the third electrode and the second electrode. Calculating the applied force can be further based on a change in self-capacitance of the third electrode. The touch-sensitive input device can be a touchpad. The touch-sensitive input device can be a touchscreen. The surface of the touch-sensitive input device can be a surface of a cover glass. The method can further include providing the calculated applied force to an application executing on the computing device. The method can further include controlling a function of the application based on a value of the calculated applied force. The identified contact with the surface of the touch-sensitive input device can be provided by a finger of a user of the computing device contacting the surface of the touch-sensitive input device at the identified location. The identified contact with the surface of the touch-sensitive input device can be provided by a stylus contacting the surface of the touch-sensitive input device at the identified location.

In another general aspect, a touch-sensitive input device can include a glass-plus-sensor module. The glass-plus-sensor module can include a cover glass including a top surface and a bottom surface, and at least two electrodes attached to the bottom surface of the cover glass. The at least two electrodes can have an associated self-capacitance. The touch-sensitive input device can include an optically clear adhesive layer (OCA) layer, a display device having a top surface and a bottom surface, and a ground plane attached to the bottom surface of the display device. The OCA layer can attach the bottom surface of the cover glass to the top surface of the display device. The glass-plus-sensor module can bend towards the display device at a point of contact of a conductive element with the top surface of the cover glass, the bending changing, for each of the at least two electrodes, the self-capacitance associated with the electrode, and a calculation of a force applied by the contact of the conductive element with the top surface of the cover glass being based on the change in self-capacitance for each electrode.

Implementations can include one or more of the following features, alone or in combination with one or more other features. For example, the OCA layer can have a thickness. The calculation of a force applied by the contact of the conductive element with the top surface of the cover glass can be further based on the thickness of the OCA layer. The self-capacitance associated with the electrode can be a capacitance as measured between the electrode and the ground plane. The at least two electrodes can be adjacent to one another. The calculation of a force applied by the contact of the conductive element with the top surface of the cover glass can be further based on a mutual capacitance between the at least two electrodes. The conductive element can be one of a finger of a user and a stylist.

In yet another general aspect, a computing device can include at least one controller, and a touch-sensitive input device configured to facilitate interaction by a user with a graphical user interface (GUI). The touch-sensitive input device can include a glass-plus-sensor module including a cover glass including a top surface and a bottom surface, and at least two electrodes attached to the bottom surface of the cover glass, the at least two electrodes having an associated self-capacitance. The touch-sensitive input device can further include a display device having a top surface and a bottom surface, the computing device being configured to render the GUI on the display device, an optically clear adhesive layer (OCA) layer attaching the bottom surface of the cover glass to the top surface of the display device, and a ground plane attached to the bottom surface of the display device. The at least one controller and the touch-sensitive input device can be collectively configured to detect contact of a conductive element with the top surface of the cover glass, and based on the detected contact, determine, for each of the at least two electrodes, a self-capacitance associated with the electrode, and calculate a force applied by the contact of the conductive element with the top surface of the cover glass based on the determined self-capacitance associated with each of the at least two electrodes.

Implementations can include one or more of the following features, alone or in combination with one or more other features. For example, the at least one controller can be configured to execute an application on the computing device, and provide the calculated applied force as input to the application. The conductive element can be one of a finger of a user and a stylist. The self-capacitance associated with the electrode can be a capacitance as measured between the electrode and the ground plane. The at least one controller and the touch-sensitive input device can be collectively configured to determine, for each of the at least two electrodes, a mutual capacitance between the at least two electrodes. Calculating a force applied by the contact of the conductive element with the top surface of the cover glass can be further based on the determined mutual capacitance between the at least two electrodes.

The details of one or more implementations are set forth in the accompanying drawings and the description below. Other features will be apparent from the description and drawings, and from the claims.

Figure 1:
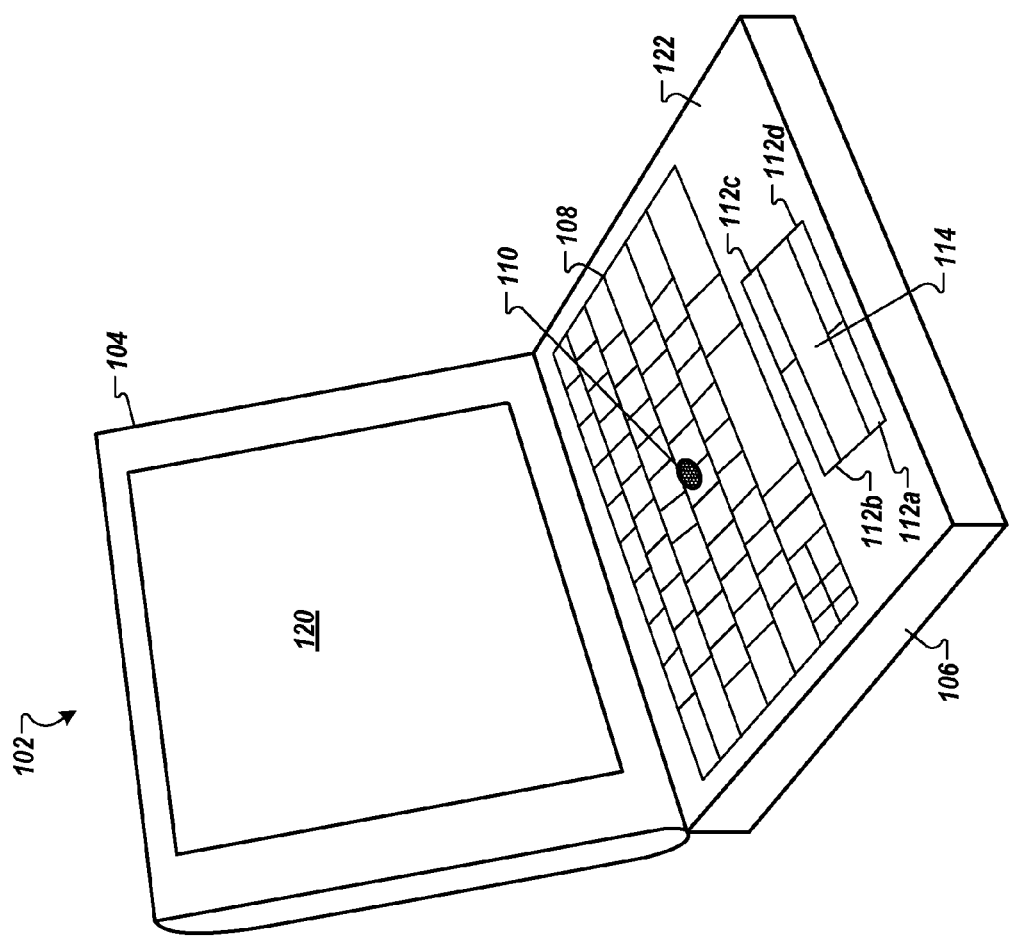
FIG. 1 is a diagram that illustrates an example computing device that includes touch-sensitive input devices, such as a touchscreen display device and a touchpad.

The details of one or more implementations are set forth in the accompanying drawings and the description below. Other features will be apparent from the description and drawings, and from the claims.

DETAILED DESCRIPTION

A trackpad, a touchpad, and a touchscreen display device can be considered (referred to as) touch-sensitive input devices. One or more touch-sensitive input devices can be included in a computing device. Each touch-sensitive input device can include a tactile sensing surface (e.g., a capacitive sensing surface, a resistive and capacitive sensing surface). The touch-sensitive input device can be configured to facilitate interaction by a user with a graphical user interface (GUI) displayed on a display device (e.g., a touchscreen display device) included in the computing device. In some implementations, the touch-sensitive input device can detect a position and a motion of one or more fingers of a user as the one or more fingers contact the tactile sensing surface of the touch-sensitive input device.

In some cases, the computing device can use the detected motion and/or the detected position of the one or more fingers of the user with the tactile sensing surface of the touch-sensitive input device to determine a relative position on the display device (and in relation to the GUI displayed on the display device) that corresponds with the position of the one or more fingers of the user. In some cases, the computing device can use the detected motion and/or the detected position of the one or more fingers of the user with the tactile sensing surface of the touch-sensitive input device to affect movement of a cursor displayed in the GUI. In some cases, the computing device can use a detected motion and/or a detected position of the one or more fingers of the user with the tactile sensing surface in combination with a detected force exerted by the one or more fingers of the user on the tactile sensing surface of the touch-sensitive input device when controlling a position and/or movement of a cursor displayed in the GUI.

In some implementations, a contact with the touch-sensitive input device can be provided by a stylus. A user can use and manipulate the stylus as they would one or more fingers of the user when contacting the tactile sensing surface of the touch-sensitive input device.

Computing devices can include one or more touch-sensitive input devices that include a touch-sensitive surface (e.g., a touchscreen, a trackpad, a touchpad). The touch-sensitive surface can determine when a user is touching (making contact with) the surface. In some implementations, the contact can be one or more fingers of a user that are touching (are in contact with) the touch-sensitive surface. In some implementations, the contact can be made by a stylus as manipulated and used by a user on the touch-sensitive surface of the touch-sensitive input device. As described herein, processes and methods for determining a position, a location, and/or a force of a detected contact with a touch-sensitive surface can be the same for one or more fingers of a user touching or contacting the touch-sensitive surface and for a stylus contacting the touch-sensitive surface.

In addition to determining when a user is making contact with the touch-sensitive surface of the touch-sensitive input device, the computing device can determine the location of the contact on the surface of the touch-sensitive input device (e.g., a location of a contact of a finger of the user on the surface of the touch-sensitive input device). In addition, in some cases, the computing device can measure a force exerted by the finger of the user while touching (contacting) the touch-sensitive surface of the touch-sensitive input device at the determined location.

In some implementations, a touch-sensitive input device can include one or more force sensors that can be used to measure a force exerted by the user (exerted by one or more fingers of the user) when contacting the surface of the touch-sensitive input device. In some cases, force sensors may be expensive and may be difficult to integrate into a touch-sensitive input device included in a computing device that may have size and thickness limitations (e.g., a mobile phone, a tablet device).

In some implementations, a touch-sensitive input device can include a capacitive touch sensor that a computing device can use to determine when a user is contacting the surface of the touch-sensitive input device (e.g., when one or more fingers of a user are touching (contacting) the surface of the touch-sensitive input device). In addition, in some cases, the computing device can use the capacitive touch sensor to calculate an estimate of a force applied by the user to the surface of the touch-sensitive input device (e.g., a force applied by (exerted by) one or more fingers of the user when contacting (touching) the surface of the touch-sensitive input device). In doing so, the computing device may not need any additional components and/or instrumentation to measure the force exerted (applied) by the user (e.g., one or more fingers of the user) when touching (contacting) the touch-sensitive surface of the touch-sensitive input device.

For example, in some implementations, a computing device can include a touchscreen display device that can be considered a touch-sensitive input device. The touchscreen display device can include a plurality of layers that can be stacked and adhered to each other. A first layer (at the top of the stack of layers) can be a cover glass. The cover glass can be flexible, bending when a force is applied to a surface of the cover glass. A touch sensor (e.g., a capacitive touch sensor) can be adhered to a bottom surface of the cover glass. The cover glass and touch sensor can be considered a glass-plus-sensor module. The glass-plus-sensor module can be adhered to (laminated to) a display device (e.g., a Liquid Crystal Display (LCD), an organic light-emitting diode (OLED)) using an optically clear adhesive (OCA). The display device can include a ground plane and can be referred to as the display device-plus-ground plane. In an example where the display device is an LCD, the display device and ground plane can be referred to as the LCD/GND plane.

When a force is applied to the touchscreen display device, the cover glass can bend towards the display device-plus-ground plane (e.g., the LCD/GND plane). The degree to which the cover glass can bend can be a function of the applied force. Because the touch sensor (e.g., a capacitive touch sensor) is physically adhered to (connected to) the cover glass, it follows that electrodes included in the touch sensor are also physically adhered to (connected to) the cover glass and, as such, will bend and be displaced based on the applied force. The self-capacitance of each electrode can vary as a function of the deformation of the cover glass, which is based on the applied force to the cover glass. In some implementations, an estimate of the applied force to a touchscreen display device can be estimated by measuring a change in a self-capacitance of the electrodes included in the touch sensor. When estimating the applied force based on the change in a self-capacitance of the electrodes, the effect of a finger-coupled capacitance can be compensated.

In some implementations, only the changes in the self-capacitances of electrodes located farthest away from the determined location of the contact of a finger of a user on the surface of the touchscreen display device are considered when estimating the applied force. The electrodes located farthest away from the determined location of the contact of the finger of the user on the surface of the touchscreen display device are used because the effect of the finger-coupled capacitance decays exponentially as the distance between an electrode and a location of contact of the finger of the user on the surface of the touchscreen increases. In some implementations, a change in mutual capacitance between adjacent electrodes at the determined location of the contact of the finger of the user on the surface of the touchscreen display device can be used to estimate a finger-coupled capacitance. The computing device can use the determined finger-coupled capacitance to calculate and estimate the applied force.

FIG. 1 is a diagram that illustrates an example computing device 102 that includes touch-sensitive input devices, such as a touchscreen display device 120 and a touchpad 114. As included herein, the terms trackpad, trackpad device, track-pad apparatus, touchpad, touchpad device and touchpad apparatus may be used interchangeably. In addition, as included herein, the terms touchscreen, touchscreen display, touchscreen display device, and touchscreen apparatus may be used interchangeably.

The touchscreen display device 120 and touchpad 114 can be pressure-sensitive, touch-sensitive input devices, such as those described herein. A user can interact with the touchscreen display device 120 and the touchpad 114 to facilitate interaction with the computing device 102. A user can interact with the touchscreen display device 120 and the touchpad 114 to facilitate interaction with an application executing on the computing device 102. For example, the application can provide (display) a graphical user interface (GUI) on the touchscreen display device 120. A user can interact with the touchscreen display device 120 and/or the touchpad 114 to control cursor movements in the GUI displayed on the touchscreen display device 120.

In the example shown in FIG. 1, the computing device 102 includes a lid portion 104 and a base portion 106. The base portion 106 includes an input area 122. The input area 122 includes a keyboard 108, the touchpad 114, a pointer button 110, and mouse buttons 112a-d. The lid portion 104 includes the touchscreen display device 120 that is part of (housed within/mounted on) the lid portion 104 of the computing device 102.

Figure 2:
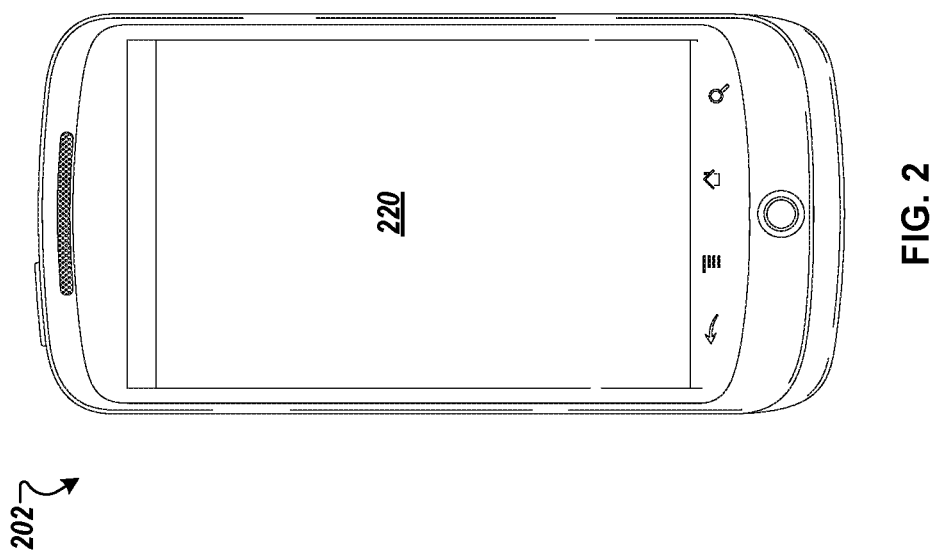
FIG. 2 is a diagram that illustrates an example computing device that includes a touchscreen display device.

In the example shown in FIG. 1, the computing device 102 may take the form of a laptop computer, a notebook computer or a netbook computer. In some implementations, the computing device 102 may be a tablet computer (as shown in FIG. 2), a desktop computer, a server computer, or a number of other computing or electronics devices. For example, implementations of a desktop computer and/or implementations of a server computer may not include a touchpad (e.g., the touchpad 114) as part of a computing device. In these implementations, a touchpad can be included in a pressure-sensitive, touch-sensitive trackpad apparatus external to (and connected to) the computing device. In addition or in the alternative, for example, implementations of a desktop computer and/or implementations of a server computer may not include a touchscreen (e.g., the touchscreen display device 120) as part of a computing device. In these implementations, a touchscreen can be included in a display device that is external to (and connected to) the computing device.

For example, the computing device 102 can be considered in a laptop mode of operation. In a laptop operating mode, a user of the computing device 102 can interact with the keyboard 108, the touchpad 114, the pointer button 110, and the mouse buttons 112a-d included in the input area 122 while viewing/interacting with content rendered on the touchscreen display device 120. The touchscreen display device 120 (e.g., in conjunction with other elements of the computing device 102) can render (display) a GUI that allows a user to interact with the computing device 102 to, for example, execute (run) applications and programs, surf the Internet or World Wide Web, or draft documents using a word processing application. In some cases, a user of the computing device 102 can interact with the GUI using the keyboard 108 alone or in conjunction with the pointer button 110 and/or the mouse buttons 112a-d to enter text or commands into an application running (executing) on the computing device 102. The keyboard 108 can take a number of forms, and the particular arrangement of the keyboard 108 can depend on the particular implementation.

In some cases, a user can also interact with the GUI using the touchpad 114 alone or in conjunction with the pointer button 110 and/or the mouse buttons 112*a*-*d*. For example, the GUI interaction can move a cursor, select objects, launch programs from icons, and/or move objects in the GUI. The particular configuration of the touchpad 114 can vary dependent on a specific implementation of the computing device 102. In some implementations, a trackpad can be larger than the touchpad 114. In some implementations, a trackpad can be smaller than the touchpad 114. In some implementations, a trackpad can be disposed in (replace and/or include) the area that includes the keyboard 108. In these implementations, a trackpad can be disposed over, or included in, the input area 122 (e.g., a top surface of the base portion 106, substantially the entire input area 122) included in the base portion 106 of the computing device 102. The input area 122 can be the same size (e.g., area (e.g., surface area), width and length) or substantially the same size as the base portion 106, thus functioning as a touch-sensitive surface (e.g., a touch-sensitive trackpad) that covers (is incorporated in) the base portion 106 of the computing device 102.

FIG. 2 is a diagram that illustrates an example computing device 202 that includes a touchscreen display device 220. The touchscreen display device 220 can be configured to operate as a display device that can, for example, display a GUI. The touchscreen display device 220 can be configured to operate as a pressure-sensitive, touch-sensitive input device. A user can interact with the touchscreen display device 220 in the same manner as interactions with touchscreen display devices described herein, in order to provide input to the computing device 202. For example, the computing device 202 can be a tablet computer, a smartphone, a personal digital assistant, a mobile phone, or another type of mobile computing device.

Figure 3:
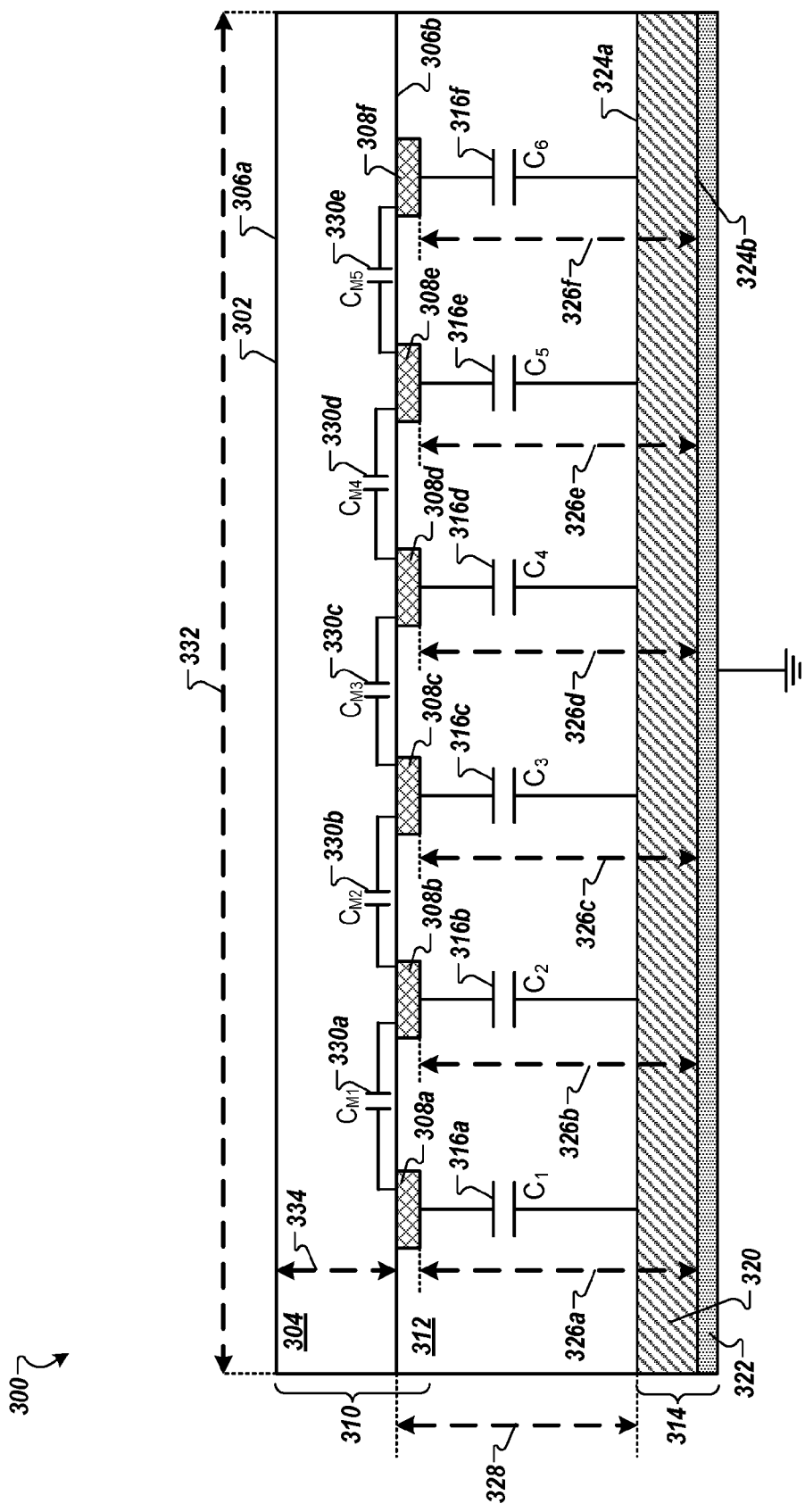
FIG. 3 is a diagram that illustrates an example implementation of a touch-sensitive input device.

FIG. 3 is a diagram that illustrates an example implementation of a touch-sensitive input device 300. In some implementations, the touch-sensitive input device 300 can be configured to determine (sense) a force applied by a user when contacting a surface 302 of the touch-sensitive input device 300. For example, referring to FIG. 1, the touch-sensitive input device 300 can be (can be included in) the touchscreen display device 120. For example, referring to FIG. 1, the touch-sensitive input device 300 can be (can be included in) the touchpad 114. In this example, the touch-sensitive input device 300 as included in the touchpad 114 may not include a display device 320. For example, referring to FIG. 2, the touch-sensitive input device 300 can be (can be included in) the touchscreen display device 220.

The touch-sensitive input device 300 can detect (determine) when a user is touching (making contact with) the surface 302 (e.g., one or more fingers of the user are in contact with the surface 302). In addition to detecting when a user is making contact with the surface 302 of the touch-sensitive input device 300, a location of the contact on the surface 302 of the touch-sensitive input device 300 (e.g., a location of a contact of a finger of the user on the surface 302 of the touch-sensitive input device 300) can be determined. In addition, in some cases, a force exerted by a finger of a user while touching (contacting) the surface 302 of the touch-sensitive input device 300 at the determined location can be measured.

In some implementations, the touch-sensitive input device 300 can include circuitry (e.g., electronic components, controllers, drivers, memory) that can be configured to detect when a user is touching (making contact with) the surface 302, determine a location of the detected contact on the surface 302, and determine (measure) a force exerted by a finger of a user while touching (contacting) the surface 302. In some implementations, a computing device that includes the touch-sensitive input device 300 can include circuitry (e.g., electronic components, controllers, drivers, memory) for use with the touch-sensitive input device 300. For example, the circuitry can be configured to detect when a user is touching (making contact with) the surface 302, determine a location of the detected contact on the surface 302, and determine (measure) a force exerted by a finger of a user while touching (contacting) the surface 302. In some cases, the circuitry for use with the touch-sensitive input device 300 can be the same circuitry used for other functions of the computing device.

Referring to FIG. 3, the touch-sensitive input device 300 includes a plurality of layers that are adhered to (attached to) one another to form a stack. A cover glass 304 comprises a top layer of the stack. The cover glass 304 includes a cover glass top surface 306*a* and a cover glass bottom surface 306*b*. In the example shown in FIG. 3, the cover glass top surface 306*a* can be the surface 302. One or more electrodes 308*a*-*f* are attached (e.g., adhered) to the cover glass bottom surface 306*b*. The cover glass 304 including the one or more attached electrodes 308*a*-*f* can be referred to, in general, as a glass-plus-sensor module 310. The glass-plus-sensor module 310 can be laminated to (e.g., attached to, adhered to) the display device 320. In implementations where the touch-sensitive input device 300 is included in a trackpad (e.g., the touchpad 114 as shown in FIG. 1), the glass-plus-sensor module 310 can be laminated to (e.g., attached to, adhered to) a ground plane 322.

In the example shown in FIG. 3, without any force applied to the surface 302 of the touch-sensitive input device 300, a height 334 of the cover glass 304 is essentially the same across a length 332 of the cover glass 304.

The display device 320 includes a display device top surface 324*a* and a display device bottom surface 324*b*. The display device bottom surface 324*b* includes (is attached to) the ground plane 322. The display device 320 and the attached ground plane 322 can be referred to, in general, as a display device-plus-ground plane 314. In some implementations, the display device 320 can include, but is not limited to, a Liquid Crystal Display (LCD) and an organic light-emitting diode (OLED). In an example where the display device 320 is an LCD, the display device-plus-ground plane 314 can be referred to as the LCD/GND plane.

FIG. 3 illustrates an example implementation of a touch-sensitive input device (e.g., the touch-sensitive input device 300) configured to determine (sense) a force applied by a user when contacting a surface of the touch-sensitive input device. The touch-sensitive input device 300 includes a plurality of layers, described herein, that can be referred to as a touch sensor stack. In some cases, a touch-sensitive input device configured to determine (sense) a force applied by a user when contacting a surface of the touch-sensitive input device can be implemented using other touch sensor stacks. The other touch sensor stacks can include, but are not limited to, a glass-film-film (GFF) stack, a one glass solution (OGS) stack, a G1F stack, a GF1 stack, a GF2 stack, a GG stack, an on-cell stack, a true in-cell stack, and a hybrid in-cell stack.

For example a sensor film can be transparent and conductive. For example, a GFF stack includes two sensor films laminated to (e.g., attached to, adhered to) glass. For example, a OGS stack includes a single sensor film laminated to (e.g., attached to, adhered to) glass. For example, a G1F stack includes a single sensor film with a sensor layer included on one side of the film where the single sensor film is laminated to (e.g., attached to, adhered to) glass. A GF1 stack includes a single sensor film with two sensor layers included on one side of the film where the single sensor film is laminated to (e.g., attached to, adhered to) glass. A GF2 stack includes a single sensor film with a sensor layer included on each side of the film where the single sensor film is laminated to (e.g., attached to, adhered to) glass. For example, a GG stack includes a cover glass and a single sensor glass. For example, an on-cell stack can include a separate layer for touch "receive" (RX) and a separate layer for touch "transmit" (TX) functions where each of the separate layers are placed/located on top of (above) a color filter and a display device. For example, an in-cell stack can include a separate layer for touch "receive" (RX) and a separate layer for touch "transmit" (TX) functions where at least one of the separate layers is placed/located under (below) a color filter and on top of (above) a display device. For example, in a true (one sided) in-cell stack both the touch RX layer and the touch TX layer are placed/located under (below) a color filter and on top of (above) a display device. For example, in a hybrid (two sided) in-cell stack only one layer (e.g., the touch TX layer) is placed/located under (below) a color filter and on top of (above) a display device. The use of each touch sensor stack in a touch-sensitive input device can include appropriate changes to the measurement techniques discussed herein for the touch sensor stack included in the touch-sensitive input device 300.

In some implementations, a cover glass can be replaced with a touch surface that includes a plastic or polymers (e.g., a Poly(methyl methacrylate) (PMMA)). In some implementations, a plastic or polymer touch surface can be an integral part of a display stack that incorporates a display device. For example, the plastic or polymer touch surface can be considered a top polarizer for the display device.

Referring to FIG. 3, the glass-plus-sensor module 310 can be laminated to (e.g., attached to, adhered to) the display device-plus-ground plane 314 using an optically clear adhesive (e.g., shown in general as an optically clear adhesive layer (OCA) layer 312). Specifically, the cover glass bottom surface 306b of the glass-plus-sensor module 310 (that includes the attached one or more electrodes 308a-f) can be laminated to (e.g., attached to, adhered to) the display device top surface 324a (which is essentially a top surface of the display device-plus-ground plane 314). An electrode (e.g., the electrode 308a-f) can be located (placed at) a respective distance 326a-f from the ground plane 322. The OCA layer 312 can have a thickness $t_{oca}$ 328.

A mutual capacitance between adjacent electrodes can be represented by capacitors 330a-e. The mutual capacitance can be established by electric fields that propagate through the cover glass 304 and the OCA layer 312 due to a potential difference between adjacent electrodes.

In some implementations, the touch-sensitive input device 300 can be configured to detect (determine) when a user is touching and/or otherwise making contact with the surface 302. For example, the touch-sensitive input device 300 can be configured to detect (determine) when one or more fingers of the user are in contact with the surface 302 by monitoring a change in a self-capacitance (represented by capacitors 316a-f) of each of the electrodes 308a-f, respectively. Referring to the example implementation of the touch-sensitive input device 300 shown in FIG. 3, a measured value for a self-capacitance (e.g., the measured value of the capacitance of the capacitor 316a) of an associated electrode (e.g., the electrode 308a) can be primarily a measured capacitance (e.g., the value of the representative capacitor 316a) between the electrode (e.g., the electrode 308a) and a ground plane (e.g., the ground plane 322). In addition, the measured value of a self-capacitance (e.g., the measured value of the capacitance of the capacitor 316a) of an associated electrode (e.g., the electrode 308a) can be a function of (associated with) a size of the electrode (e.g., a size of the electrode 308a), a dielectric constant associated with the optically clear adhesive included in the OCA layer 312, and a distance between an electrode and the ground plane (e.g., the distance 326a).

For example, it can be assumed that the thickness $t_{oca}$ 328 of the OCA layer 312 can vary based on an applied pressure to the surface 302 of the touch-sensitive input device 300. The variation in the thickness $t_{oca}$ 328 of the OCA layer 312 can effect a measured value of a self-capacitance of an electrode. This relationship can be represented by Equation 1.

$$C_n \propto t_{oca},\qquad\text{Equation 1:}$$

where $C_n$ is a measured capacitance of an associated electrode and n=1 to n=6 (referring to FIG. 3).

Figure 4:
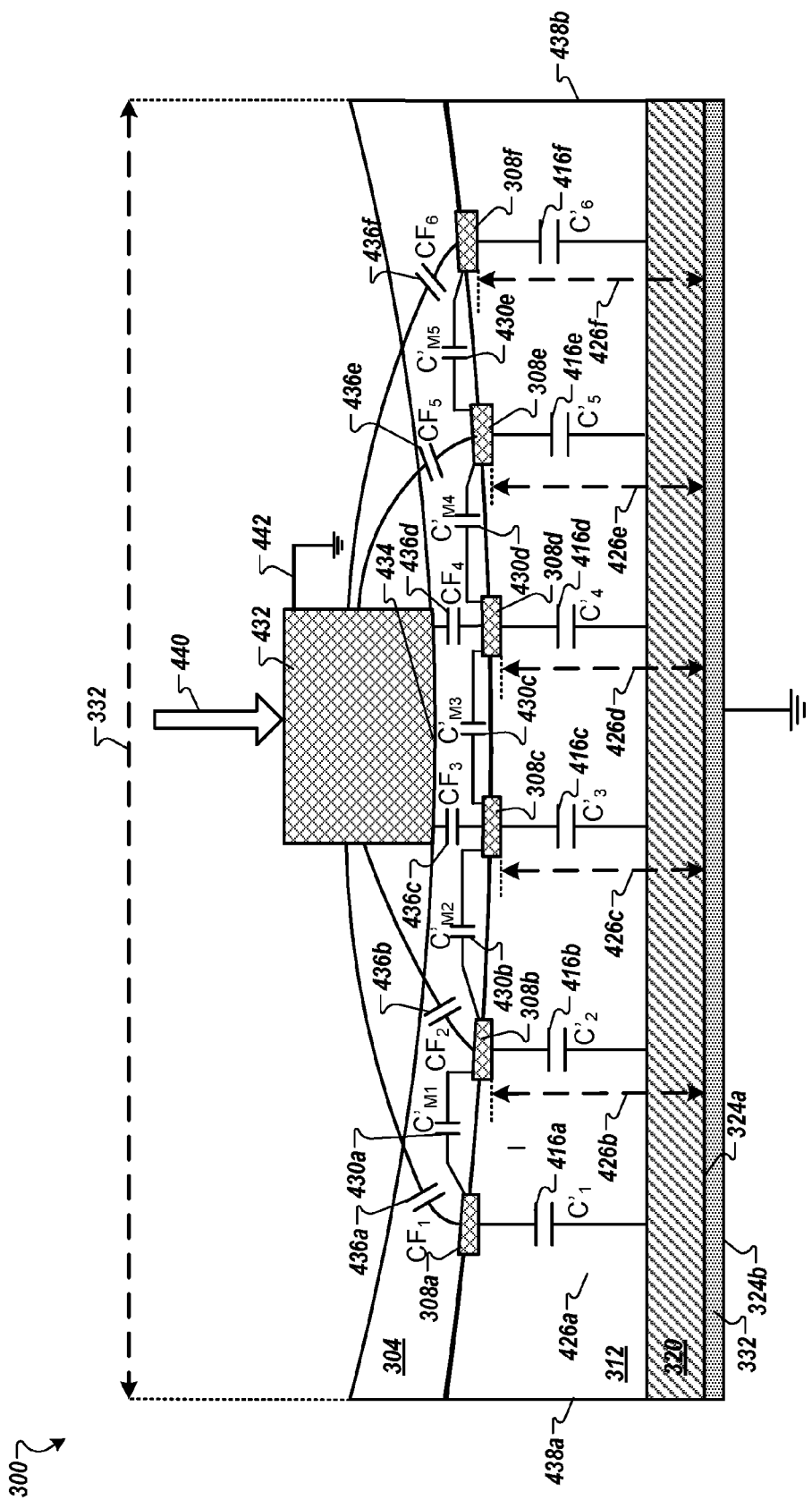
FIG. 4 is a diagram that illustrates an example implementation of the touch-sensitive input device when a force is applied by a user at a point of contact.

FIG. 4 is a diagram that illustrates an example implementation of the touch-sensitive input device 300 when a force (shown by the downward arrow 440) is applied by a user (e.g., one or more fingers of a user, a stylus controlled by a user) at a point of contact 434. The touch-sensitive input device 300 can detect (determine) when a user is touching (making contact with) the surface 302 (e.g., a finger of the user can contact (touch) the surface 302 at the point of contact 434, a tip or point of a stylus can contact (touch) the surface 302 at the point of contact 434). The contact and applied force can be shown in general by a conductive element 432 contacting (touching) the surface 302 of the touch-sensitive input device 300 at the point of contact 434. In addition to detecting when a user is making contact with the surface 302 of the touch-sensitive input device 300, a location of the contact on the surface 302 of the touch-sensitive input device 300 (e.g., the point of contact 434) can be determined.

In addition, in some cases, a force exerted by a finger of a user (or by a stylus) while touching (contacting) the surface 302 of the touch-sensitive input device 300 at the determined location can be measured. As shown in FIG. 4, for example, a finger of the user can touch (make contact with) the surface 302 at the point of contact 434 and press the cover glass 304 (which can be flexible) in a downward direction as shown by arrow 440. The magnitude of the downward applied force can cause the cover glass 304 and the glass-plus-sensor module 310 to bend towards the display device 320 (towards the display device-plus-ground plane 314). The magnitude of the bending can be a function of one or more of the magnitude of the applied force, the material properties of the cover glass 304 (e.g., how easily the cover glass 304 can bend, how much force is needed to bend the cover glass 304 a particular amount), the material properties of the OCA, and the location of the point of contact on the surface 302 of the touch-sensitive input device 300.

The bending of the cover glass 304 changes the geometry of the cover glass 304 from having the height 334 that was essentially the same along the length 332 of the cover glass 304 when no pressure was applied to the surface 302 (e.g., as shown in FIG. 3), to having multiple different heights (e.g., heights 440a-f) along the length 332 of the cover glass 304 when a force is applied at on the surface 302 at the point of contact 434. The bending of the cover glass 304 because of the force (pressure) applied to the cover glass 304 at the point of contact 434 changes a geometry of the cover glass 304. A change in the geometry of the cover glass 304 along the length 332 of the cover glass 304 can decrease a distance (e.g., distances 426a-f) from one or more of the electrodes 308a-f to the ground plane 322. For example, referring to FIG. 3 and FIG. 4, a distance 426c of the electrode 308c from the ground plane 322 is less than a distance 326c of the electrode 308c from the ground plane 322. For example, a distance 426a of the electrode 308a from the ground plane 322 is substantially the same as a distance 326a of the electrode 308a from the ground plane 322.

In general, a distance from an electrode to the ground plane 322 decreases the closer an electrode is to the point of contact 434. The farther from the location of the point of contact an electrode is located, the larger (greater) the distance between the electrode and the ground plane 322. Equation 2 can represent this relationship.

$$\Delta t_{oca} \propto F,$$ Equation 2:

where $\Delta t_{oca}$ is a change in the thickness of the OCA and F is the applied force. In some implementation, the applied force F can change a thickness t of any combination of a heterogeneous stack of materials, the thickness t being a distance between an electrode and a reference ground against which a capacitance of the electrode is being measured.

In addition, the existence of the contact of the conductive element 432 (e.g., a finger of a user, a stylus) with the surface 302 of the touch-sensitive input device 300 introduces additional capacitances (e.g., represented by capacitors 436a-f) between the electrodes 308a-f, respectively, and the conductive element 432. Each of the capacitors 436a-f represent capacitances between the electrodes 308a-f, respectively, and a ground 442 provided by (through) the conductive element 432 at the point of contact 434. In the example shown in FIG. 4, a self-capacitance of each of the electrodes 308a-f can be a function of (e.g., the sum of) the capacitors 416a-f and the capacitors 436a-f. In some implementations, an estimate of an applied force by the conductive element 432 at the point of contact 434 can be calculated using the additional capacitances (e.g., represented by capacitors 436a-f) between the electrodes 308a-f.

In a first implementation, when calculating an estimate of the force applied by the conductive element 432 at the point of contact 434, the changes in the self-capacitance of electrodes located at distances that are farther from the point of contact 434 can be considered and changes in the self-capacitance of electrodes located at distances that are closer to the point of contact 434 can be ignored because the effect on the self-capacitance of an electrode due to the presence of the conductive element 432 at the point of contact 434 decreases exponentially the further away from the point of contact 434 the electrode is located. For example, referring to FIG. 4, the self-capacitance of electrodes 308a, 308b, 308e, and 308f can be used to calculate an estimate of the force applied by the conductive element 432 at the point of contact 434.

When using the first implementation to calculate an estimate of the force applied by the conductive element 432 at the point of contact 434, the bending of the cover glass 304 due to the force applied by the conductive element 432 at the point of contact 434 may not be significant enough to result in the additional capacitances (e.g., represented by capacitors 436a-f) between the electrodes 308a-f, respectively, and the conductive element 432 having a measurable impact on the self-capacitances of each of the electrodes 308a-f.

In a second implementation, a change in a mutual capacitance between adjacent electrodes (e.g., represented by capacitors 430a-e) can be calculated and used to estimate a capacitance introduced by the conductive element 432 at the point of contact 434. The capacitance introduced by the conductive element 432 at the point of contact 434 can be referred to as a contact-coupled capacitance. The change in the mutual capacitance is the difference between a mutual capacitance between two adjacent electrodes when no contact is detected with the surface 302 of the touch-sensitive input device 300 and a mutual capacitance between the two adjacent electrodes when contact is detected with the surface 302 of the touch-sensitive input device 300. The change (difference) in the mutual capacitance between adjacent electrodes can be used to estimate a capacitance between an electrode and the conductive element 432 at the point of contact 434. The estimated capacitance between the electrode and the conductive element 432 at the point of contact 434 can be used to calculate an estimate of the force applied by the conductive element 432 at the point of contact 434. In this second implementation, referring to FIG. 4, information provided by and obtained from all of the electrodes 308a-f can be used in calculating an estimate of the force applied by the conductive element 432 at the point of contact 434.

As described, changes in mutual capacitance between adjacent electrodes and changes in the self-capacitance of electrodes located at distances that are farther from a point of contact can be used when calculating an estimate of a force applied by a conductive element 432 at a point of contact on a surface of a touch-sensitive input device. Equation 3 shows a representation of a calculation for determining an estimate of a force applied by a conductive element 432 at the point of contact 434 on the surface 302 of the touch-sensitive input device 300.

$$\hat{F} = f(C_n, C'_n, \Delta C_m),$$ Equation 3:

where, referring to FIG. 3 and FIG. 4, n=1-6, and m=1-5, and $C_n$ is the self-capacitance (represented by capacitors 316a-f ($C_1$ to $C_6$, respectively)) of each of the electrodes 308a-f when no contact is made with the surface 302 of the touch-sensitive input device 300, $C'_n$ is the self-capacitance (represented by capacitors 416a-f ($C'_1$ to $C'_6$, respectively)) of each of the electrodes 308a-f when contact is detected with the surface 302 of the touch-sensitive input device 300 at the point contact 434, and $\Delta C_m = |C_m - C'_m|$ is the change in the mutual capacitance between two electrodes. Referring to FIG. 3, capacitors 330a-e ($C_{M1}$ to $C_{M5}$, respectively) are representative of a mutual capacitance between adjacent electrodes 308a-f when no contact is detected with the surface 302 of the touch-sensitive input device 300. Referring to FIG. 4, capacitors 430a-e ($C'_{M1}$ to $C'_{M5}$, respectively) are representative of a mutual capacitance between adjacent electrodes 308a-f when contact is detected with the surface 302 of the touch-sensitive input device 300 at the point of contact 434.

In some implementations, a contact of a conductive element 432 (e.g., a finger of a user, a stylus) with the surface 302 of the touch-sensitive input device 300 can be detected when a measured capacitance for the contact meets or exceeds a particular threshold value. The use of a threshold value can eliminate possible false contact detections.

Referring to FIG. 4, the farther away from the point of contact 434 a capacitance is measured, the smaller the measured value of the capacitance will be. For example, the value of the measured capacitance represented by capacitor 436c will be greater than the value of the measured capacitance represented by capacitor 436b. In another example, the value of the measured capacitance represented by capacitor 436d will be greater than the value of the measured capacitance represented by capacitor 436e.

In the example shown in FIG. 4, the point of contact 434 is located in approximately a center of the touch-sensitive input device 300. In some cases, the point of contact can be located closer to a first end 438a of the touch-sensitive input device 300. In some cases, the point of contact can be located closer to a second end 438b of the touch-sensitive input device 300. The closer the point of contact is to an end of the touch-sensitive input device 300, the less bend the cover glass 304 may exhibit.

Figure 5:
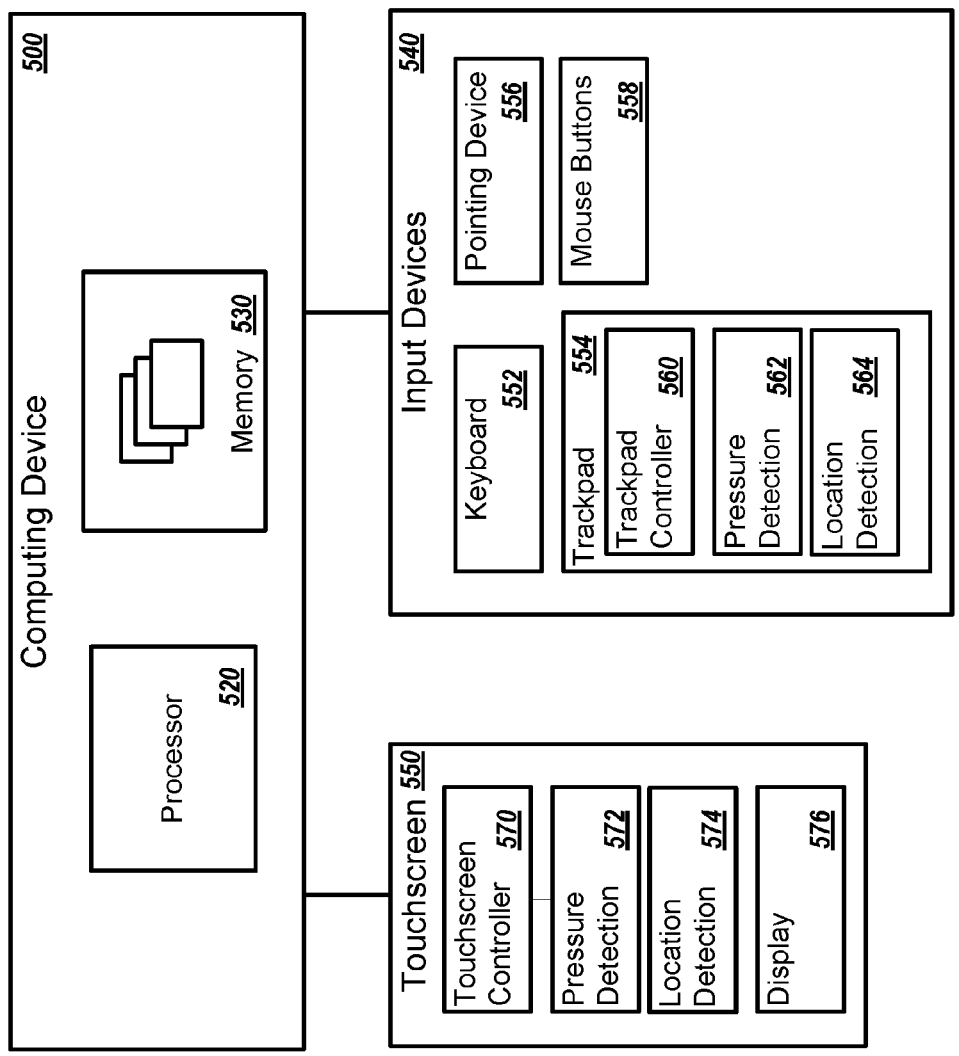
FIG. 5 is a block diagram illustrating example modules included in a computing device.

FIG. 5 is a block diagram illustrating example modules included in a computing device 500. For example, the computing device 500 can be the computing device 102 as shown in FIG. 1 or the computing device 202 as shown in FIG. 2. In the example of FIG. 5, the computing device 500 includes a processor 520 and a memory 530. In some implementations, the processor 520 can be at least one controller or other type of semiconductor computing device. The computing device 500 can be operatively coupled to input devices 540. The computing device 500 can be operatively coupled to a touchscreen 550. In some implementations, the touchscreen 550 can be included in (can be part of and integrated with) the computing device 500. In some implementations, one or more (or all of) the input devices 540 can be included in (can be part of and integrated with) the computing device 500.

The computing device 500 can receive input data from one or more of the input devices 540. A user of the computing device 500 may interact with one or more of the input devices 540 to provide input to an application running on the computing device 500. For example, the processor 520 can execute the application that may be stored in the memory 530. The application can display a user interface on the touchscreen 550. The user can interact with one or more of the input devices 540 in order to interact with and/or provide input to the application. Referring also to FIG. 1, the input devices 540 can include, but are not limited to, a keyboard 552 (e.g., the keyboard 108), a pointing device 556 (e.g., the pointer button 110), and mouse buttons 558 (e.g., mouse buttons 118a-d). In some implementations, the touchscreen 550 (e.g., the touchscreen display device 120) can be considered a display device and an input device.

In some implementations, each input device (e.g., input devices 552, 554, 556, and 558) can be configured to include circuitry and logic to process a physical input received by the respective input device into data that the input device can provide to the computing device 500. For example, the keyboard 552 can detect a user pressing the "a" key on the keyboard and can provide the input of the letter "a" (e.g., a binary representation of the letter "a") to the computing device 500. For example, the pointing device 556 and/or the mouse buttons 558 can detect user interactions and contact and can provide data representative of the interactions to the computing device 500 for input to an application running on the computing device 500.

The trackpad 554 includes a trackpad controller 560, a pressure detection module 562, and a location detection module 564. Referring to FIG. 1, the trackpad 554 can operate in a manner similar to the operation of the touchpad 114 and the touch-sensitive input device 300 as disclosed herein. For example, the trackpad 554 can detect contact with a surface of the trackpad 554 using the trackpad controller 560. The location detection module 564 can determine that the contact with the surface of the trackpad 554 is at a particular area (e.g., x-y location, a point of contact) on the trackpad 554. The pressure detection module 562 can determine (calculate using the trackpad controller 560) pressure (a force) at the area (e.g., x-y location, a point of contact) on the trackpad 554 as input to an application running on the computing device 500. The trackpad 554 can provide the determined point of contact on the trackpad 554 and the calculated pressure of the contact to the computing device 500. The computing device 500 can provide the received location of the point of contact on the trackpad 554 and the calculated pressure of the contact as input to an application running on the computing device 500.

The touchscreen 550 includes a touchscreen controller 570, a pressure detection module 572, a location detection module 574, and a display 576. Referring to FIG. 1, the touchscreen 550 can operate in a manner similar to the operation of the touchscreen display device 120 and the touch-sensitive input device 300 as disclosed herein. For example, the touchscreen 550 can detect contact with a surface of the touchscreen 550 using the touchscreen controller 570. The location detection module 574 can determine that the contact with the surface of the touchscreen 550 is at a particular area (e.g., x-y location, a point of contact) on the touchscreen 550. The pressure detection module 572 can determine (calculate using the touchscreen controller 570) pressure at the area (e.g., x-y location, a point of contact) on the touchscreen 550 as input to an application running on the computing device 500. The display 576 can provide (show) a graphical user interface (GUI) to a user interacting with the touchscreen 550. For example, an application executing on the computing device 500 can display a GUI that allows the user to enter and manipulate text and/or images in a document displayed by the application in the GUI. The touchscreen 550 can provide the determined point of contact on the touchscreen 550 and the calculated pressure of the contact to the computing device 500. The computing device 500 can provide the received location of the point of contact on the touchscreen 550 and the calculated pressure of the contact as input to an application running on the computing device 500.

Though shown as separate devices in the example in FIG. 5, in some implementations, for example when the touchscreen 550 and the input devices 540 are part of (integrated in) the computing device 500, the touchscreen controller 570 and the trackpad controller 560 can be the same device. In these implementations, in some cases, the processor 520 can perform the function of one or both of the trackpad controller 560 and the touchscreen controller 570, eliminating the need for the discrete devices. In some implementations, for example when the touchscreen 550 and the input devices 540 are part of (integrated in) the computing device 500, the pressure detection module 562 and the pressure detection module 572 may be the same module. In addition or in the alternative, the location detection module 574 and the location detection module 564 may be the same module.

Figure 6:
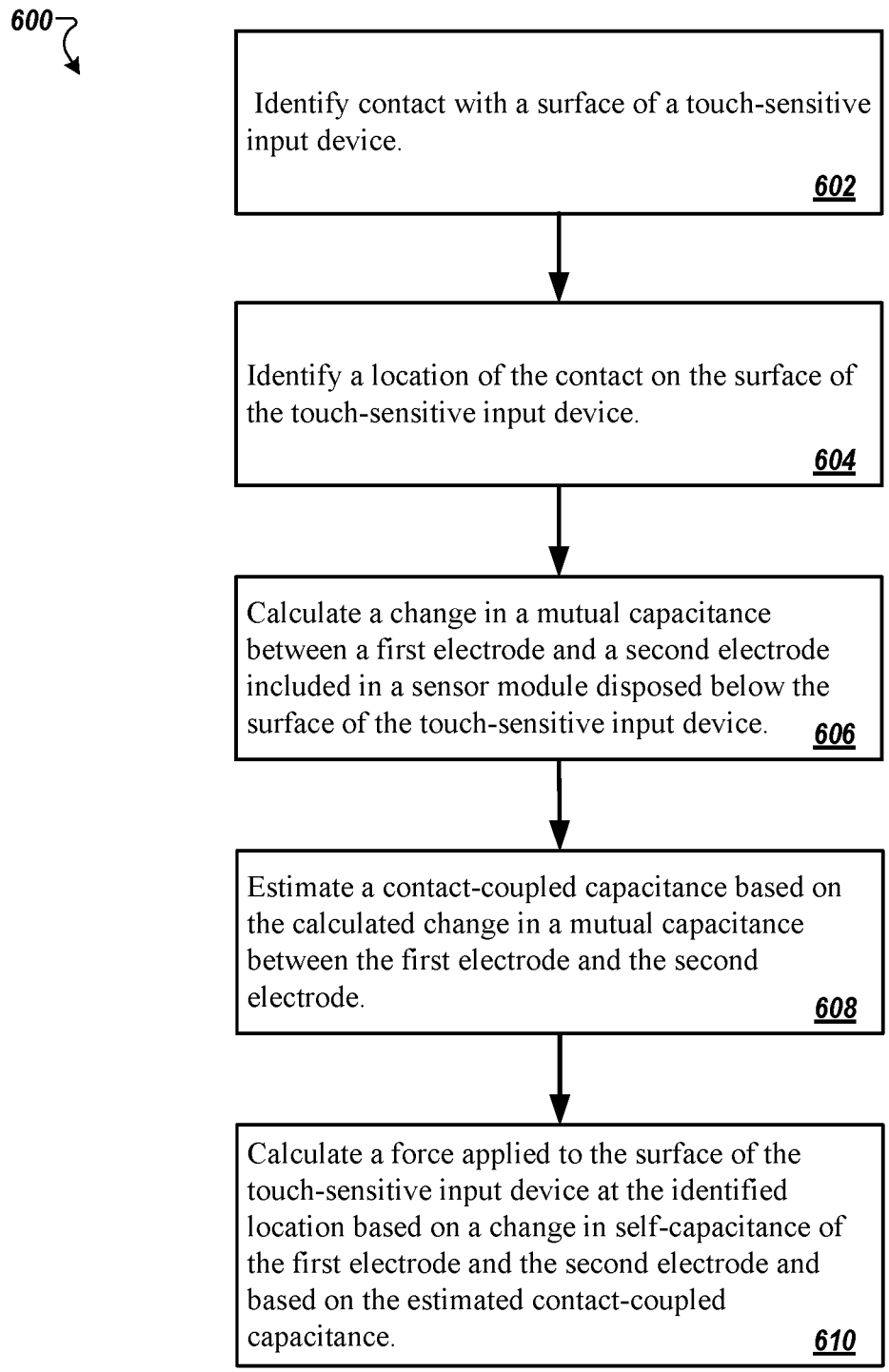
FIG. 6 is a flowchart that illustrates a method for identifying contact with a surface of a touch-sensitive input device.

FIG. 6 is a flowchart that illustrates a method 600 for identifying contact with a surface of a touch-sensitive input device. In some implementations, the systems, methods, and processes described herein can implement the method 600. For example, the method 600 can be described referring to FIGS. 1-5

Contact with a surface of a touch-sensitive input device is identified by a computing device (block 602). For example, referring to FIG. 4, the touch-sensitive input device 300 can detect (determine or identify) when a user is touching (making contact with) the surface 302 of the touch-sensitive input device 300. For example, a finger of the user contacts (touches) the surface 302 at the point of contact 434. In another example, a tip or point of a stylus contacts (touches)

the surface 302 at the point of contact 434. The contact and applied force can be shown in general by a conductive element 432 contacting (touching) the surface 302 of the touch-sensitive input device 300 at the point of contact 434.

A location of the contact on the surface of the touch-sensitive input device is identified by the computing device (block 604). For example, in addition to detecting when a user is making contact with the surface 302 of the touch-sensitive input device 300, a location of the contact on the surface 302 of the touch-sensitive input device 300 (e.g., the point of contact 434) can be identified or determined.

A change in a mutual capacitance between a first electrode and a second electrode included in a sensor module disposed below the surface of the touch-sensitive input device is calculated (block 606). The first electrode can be adjacent to the second electrode. The first electrode and the second electrode can be located approximate to the identified location of the contact on the surface of the touch-sensitive input device. For example, referring to FIG. 3 and FIG. 4, the change in the mutual capacitance can be the difference between the mutual capacitance between the first electrode and the second electrode when no contact is detected with the surface 302 of the touch-sensitive input device 300 (mutual capacitance 330b) and a mutual capacitance between the first electrode and the second electrode when contact is detected with the surface 302 of the touch-sensitive input device 300 (mutual capacitance 430b).

A contact-coupled capacitance based on the calculated change in a mutual capacitance between the first electrode and the second electrode can be estimated (block 608). For example, referring to FIG. 3 and FIG. 4, a change (difference) in the mutual capacitance between the first electrode (e.g., electrode 308b) and the second electrode (e.g., electrode 308c) can be used to estimate a capacitance between the first electrode and the conductive element 432 at the point of contact 434 (e.g., the capacitor 436b).

A force applied to the surface of the touch-sensitive input device at the identified location can be calculated based on a change in self-capacitance of the first electrode and the second electrode and based on the estimated contact-coupled capacitance (block 610). For example, equation 3 above shows a representation of a calculation for determining an estimate of a force applied by a conductive element 432 at the point of contact 434 on the surface 302 of the touch-sensitive input device 300.

Figure 7:
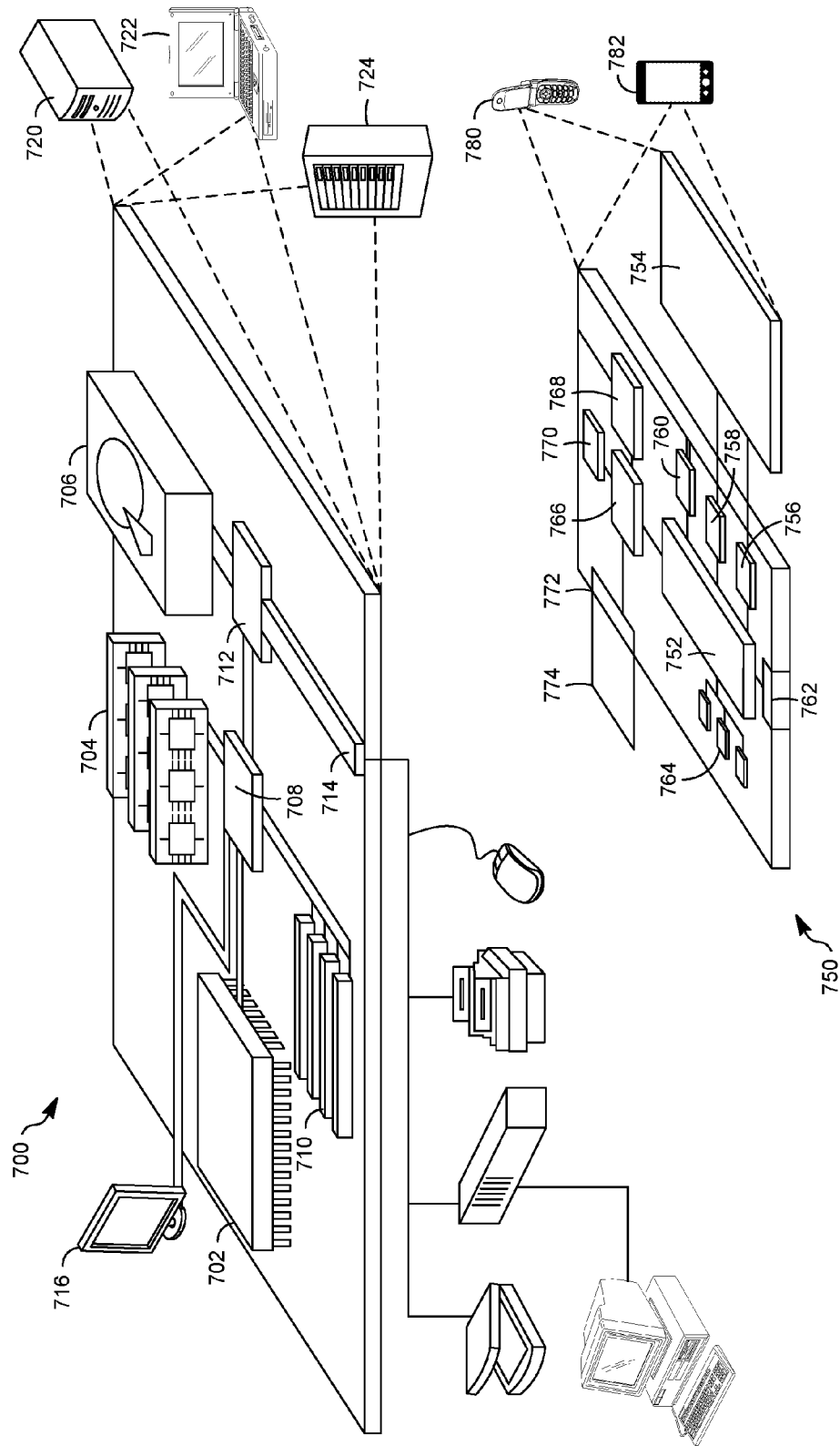
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   identifying, by a computing device, contact with a surface of a touch-sensitive input device;
   identifying, by the computing device, a location of the contact on the surface of the touch-sensitive input device;
   calculating a change in a mutual capacitance between a first electrode and a second electrode included in a sensor module disposed below the surface of the touch-sensitive input device;
   calculating a change in a mutual capacitance between the second electrode and a third electrode included in the sensor module, the first electrode being adjacent to the second electrode, the first electrode and the second electrode located approximate to the identified location of the contact on the surface of the touch-sensitive input device, and the third electrode being adjacent to the second electrode and located closer to the identified location of the contact on the surface of the touch-sensitive input device than the first electrode;
   estimating a contact-coupled capacitance based on the calculated change in the mutual capacitance between the first electrode and the second electrode, and based on the calculated change in the mutual capacitance between the second electrode and the third electrode; and
   calculating a force applied to the surface of the touch-sensitive input device at the identified location based on:
   a change in self-capacitance of the first electrode,
   a change in self-capacitance of the second electrode,
   a change in self-capacitance of the third electrode, and
   the estimated contact-coupled capacitance.

2. The method of claim 1, wherein the touch-sensitive input device is a touchpad.

3. The method of claim 1, wherein the touch-sensitive input device is a touchscreen.

4. The method of claim 3, wherein the surface of the touch-sensitive input device is a surface of a cover glass.

5. The method of claim 1, further comprising:
   providing the calculated applied force to an application executing on the computing device.

6. The method of claim 5, further comprising:
   controlling a function of the application based on a value of the calculated applied force.

7. The method of claim 1, wherein the identified contact with the surface of the touch-sensitive input device is provided by a finger of a user of the computing device contacting the surface of the touch-sensitive input device at the identified location.

8. The method of claim 1, wherein the identified contact with the surface of the touch-sensitive input device is provided by a stylus contacting the surface of the touch-sensitive input device at the identified location.

9. A non-transitory, machine-readable medium having instructions stored thereon, the instructions, when executed by one or more processors, cause a computing device to:
   identify contact with a surface of a touch-sensitive input device;
   identify a location of the contact on the surface of the touch-sensitive input device;
   calculate a change in a mutual capacitance between a first electrode and a second electrode included in a sensor module disposed below the surface of the touch-sensitive input device;
   calculate a change in a mutual capacitance between the second electrode and a third electrode included in the sensor module, the first electrode being adjacent to the second electrode, the first electrode and the second electrode located approximate to the identified location of the contact on the surface of the touch-sensitive input device, and the third electrode being adjacent to the second electrode and located closer to the identified location of the contact on the surface of the touch-sensitive input device than the first electrode;
   estimate a contact-coupled capacitance based on the calculated change in the mutual capacitance between the first electrode and the second electrode, and based on the calculated change in the mutual capacitance between the second electrode and the third electrode; and
   calculate a force applied to the surface of the touch-sensitive input device at the identified location based on:
   a change in self-capacitance of the first electrode,
   a change in self-capacitance of the second electrode,
   a change in self-capacitance of the third electrode, and
   the estimated contact-coupled capacitance.

10. The non-transitory, machine-readable medium of claim 9, wherein the touch-sensitive input device is one of a touchpad or a touchscreen.

11. The non-transitory, machine-readable medium of claim 10, wherein the surface of the touch-sensitive input device is a surface of a cover glass.

12. The non-transitory, machine-readable medium of claim 9, wherein the instructions, when executed by the one or more processors, further cause the computing device to provide the calculated applied force to an application executing on the computing device.

13. The non-transitory, machine-readable medium of claim 12, wherein the instructions, when executed by the one or more processors, further cause the computing device to control a function of the application based on a value of the calculated applied force.

14. The non-transitory, machine-readable medium of claim 9, wherein the identified contact with the surface of the touch-sensitive input device is provided by a finger of a user of the computing device contacting the surface of the touch-sensitive input device at the identified location.

15. The non-transitory, machine-readable medium of claim 9, wherein the identified contact with the surface of the touch-sensitive input device is provided by a stylus contacting the surface of the touch-sensitive input device at the identified location.

16. A computing device comprising:
at least one controller; and
a touch-sensitive input device including a surface, and a sensor module disposed below the surface of the touch-sensitive input device, the sensor module including a first electrode, a second electrode, and a third electrode, the first electrode being adjacent to the second electrode, and the third electrode being adjacent to the second electrode, wherein the at least one controller and the touch-sensitive input device are collectively configured to:
identify contact with the surface of the touch-sensitive input device;
identify a location of the contact on the surface of the touch-sensitive input device;
calculate a change in a mutual capacitance between the first electrode and the second electrode;
calculate a change in a mutual capacitance between the second electrode and the third electrode included in the sensor module, the first electrode and the second electrode located approximate to the identified location of the contact on the surface of the touch-sensitive input device, and the third electrode being located closer to the identified location of the contact on the surface of the touch-sensitive input device than the first electrode;
estimate a contact-coupled capacitance based on the calculated change in the mutual capacitance between the first electrode and the second electrode, and based on the calculated change in the mutual capacitance between the second electrode and the third electrode; and
calculate a force applied to the surface of the touch-sensitive input device at the identified location based on:
a change in self-capacitance of the first electrode,
a change in self-capacitance of the second electrode,
a change in self-capacitance of the third electrode, and
the estimated contact-coupled capacitance.

17. The computing device of claim 16, wherein the touch-sensitive input device is one of a touchpad or a touchscreen.

18. The computing device of claim 16, wherein the surface of the touch-sensitive input device is a surface of a cover glass.

19. The computing device of claim 16, wherein the identified contact with the surface of the touch-sensitive input device is provided by one of a finger of a user of the computing device or a stylus contacting the surface of the touch-sensitive input device at the identified location.

20. The computing device of claim 16,
wherein the a touch-sensitive input device further includes a ground plane,
wherein the self-capacitance of the first electrode is a capacitance as measured between the first electrode and the ground plane,
wherein the self-capacitance of the second electrode is a capacitance as measured between the second electrode and the ground plane, and
wherein the self-capacitance of the third electrode is a capacitance as measured between the third electrode and the ground plane.

* * * * *

UNITED STATES PATENT AND TRADEMARK OFFICE
CERTIFICATE OF CORRECTION

PATENT NO. : 9,898,153 B2  
APPLICATION NO. : 15/058584  
DATED : February 20, 2018  
INVENTOR(S) : Sundara-Rajan Page 1 of 1

It is certified that error appears in the above-identified patent and that said Letters Patent is hereby corrected as shown below:

In the Claims

In Column 22, Line 31, Claim 20, delete "the a touch-sensitive" and insert -- the touch-sensitive --, therefor.

Signed and Sealed this
Seventeenth Day of April, 2018

Andrei Iancu
*Director of the United States Patent and Trademark Office*